EFFECT OF HYDROCARBON PARTIAL PRESSURE (PSIG) AT VARIOUS CONTACT TIMES (SECONDS)

INVENTOR.
MARION P. MOURNING

United States Patent Office 3,650,946
Patented Mar. 21, 1972

3,650,946
FLUID CATALYTIC CRACKING IN A DENSE CATALYST BED
Marion P. Mourning, Media, Pa., assignor to Gulf Oil Corporation, Pittsburgh, Pa.
Filed Sept. 10, 1969, Ser. No. 862,623
Int. Cl. B01j 9/00; C10g 11/02, 11/18
U.S. Cl. 208—120
7 Claims

ABSTRACT OF THE DISCLOSURE

A hydrocarbon feed is cracked in the presence of a fluid zeolite catalyst or a catalyst of comparable activity and/or selectivity which produces a transient maximum gasoline yield at a residence time of 5 seconds or less and in the presence of a diluent vapor or vapors which lower the partial pressure of the hydrocarbon feed and increase gasoline selectivity. Residence time is established by regulating the depth of a dense catalyst bed relative to the position of charging the hydrocarbon feed so that residence time control does not require adjustment of the charge rate of hydrocarbon or diluent vapor as generally occurs in the case of a riser reactor having a non-dense catalyst system. In this manner, the residence time is changed at a constant ratio of diluent vapor or vapors to hydrocarbon feed and the depth of the bed is controlled so that a greater yield of gasoline is recovered from the process than could be recovered in the absence of the diluent vapor.

---

Figure 1:
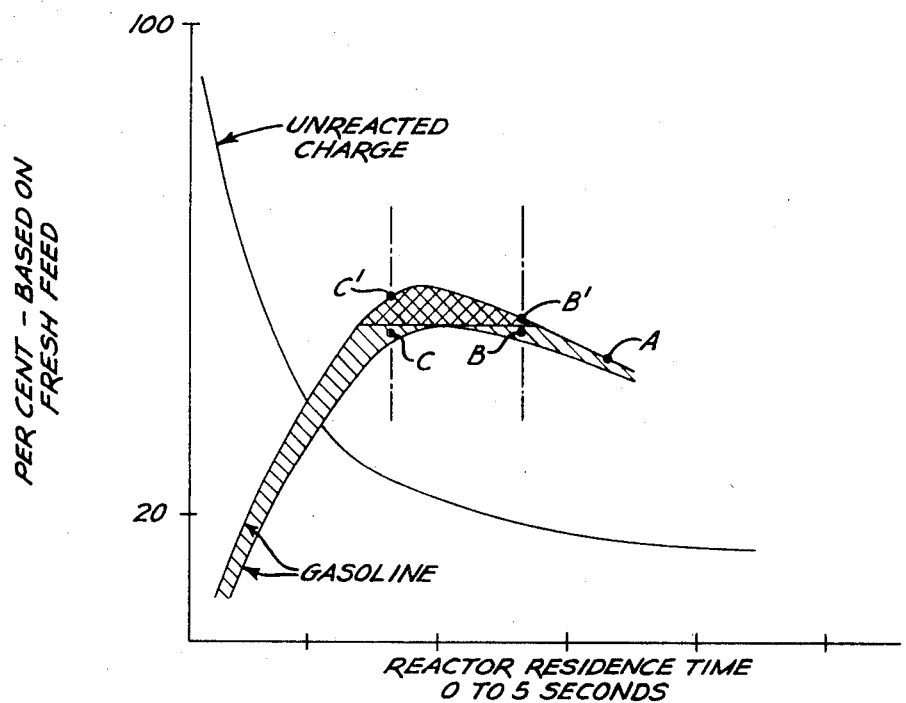

This invention relates to the cracking of a petroleum hydrocarbon feed stock to gasoline in the presence of a highly active fluid cracking catalyst such as a crystalline aluminosilicate zeolite or a catalyst of comparable activity, or selectivity, or both.

Natural or synthetic zeolite aluminosilicate cracking catalysts exhibit high activity in the cracking of hydrocarbon oils both in terms of total conversion of feed stock and in terms of selectivity towards gasoline production. The present invention relates to a method for improving the selectivity to gasoline production in cracking processes utilizing a dense fluidized bed of zeolitic cracking catalyst or a catalyst of comparable activity and/or selectivity.

In fluid catalytic cracking operations it is generally advantageous to operate the cracking reactor at pressures in the range of about 20 to 30 pounds per square inch gauge and it is undesirable in terms of the integrated operation including catalyst regeneration and power recovery from regenerator flue gases for reactor pressures to fall significantly below this level. For example, catalyst regeneration is generally favorably influenced by elevated temperatures and pressures. Furthermore, in systems where regenerator flue gas is utilized to drive a turbine to compress combustion air to be supplied to the regenerator, it is important to maintain an elevated pressure in the regenerator in order to obtain efficient turbine operation. Since spent catalyst must flow from the reactor zone to the regenerator, a correspondingly high pressure is consequently required in the reactor in order to urge catalyst toward the regenerator. However, as shown below, relatively high reactor hydrocarbon feed pressures are less favorable to gasoline selectivity in the cracking operation than relatively low pressures.

In accordance with the present invention a method is presented for advantageously improving operation of a cracking process employing a zeolitic or similar fluidized cracking catalyst in a dense bed without lowering the pressure in the reaction zone or catalyst disengaging or stripping vessel. It has previously been discovered that an unexpected advantage occurs by charging a diluent gas to the inlet of the cracking reaction zone to lower the partial pressure of the charge hydrocarbon in the reaction zone without disturbing the total pressure in the system. Any diluent which is a vapor or becomes a vapor under the conditions of the reaction zone can be used. An inert gas such as steam or nitrogen is a suitable diluent. A mixture of gases can be employed. If the diluent is a hydrocarbon, it should desirably have a boiling point below about 430° F., i.e. it should be a gasoline range hydrocarbon or lighter. If it boils above the gasoline range it will itself be a portion of the cracking feed. Recycle methane or ethylene can be employed. We have found that a lower hydrocarbon feed partial pressure at any given reaction zone total pressure produces the unexpected effect of increasing the selectivity to gasoline production at a given conversion level of fresh feed or, conversely, requiring a lower conversion of total feed to produce a given gasoline yield.

Although it has long been known that the use of an inert diluent such as steam at the hydrocarbon feed zone accomplishes certain advantageous effects in a fluid catalytic cracking operation such as assisting in fluidization of catalyst, vaporization of liquid feed, dispersal of catalyst into hydrocarbon feed, increasing reaction rate, etc., the improvement in gasoline selectivity is a recent discovery. The gasoline selectivity advantage is transient and is lost if the cracking process is not terminated in a timely manner, as explained below. Because of its transient nature the selectivity advantage has until recently been effectively masked.

It had been considered that the amount of steam to be employed in a fluid catalytic cracking process should not be great in order to avoid a reduction in residence time, and thereby a loss in conversion. However, the amount of steam or other inert gas must be sufficient to produce a significant reduction in partial pressure of the incoming hydrocarbon capable of being cracked to gasoline. Although the initial increments of partial pressure reduction exert a greater effect upon gasoline selectivity than later increments, the greater the amount of steam or other inert gas introduced relative to hydrocarbon feed the greater will be the effect upon selectivity. For example, 10 mol percent of steam based on hydrocarbon charge will reduce the partial pressure of the hydrocarbon charge 10 percent, 15 mol percent of steam will reduce the partial pressure of the hydrocarbon charge 15 percent, etc., and the greater the reduction in partial pressure the greater the gasoline selectivity advantage it is possible to achieve in accordance with this invention.

The selectivity advantage due to the presence of an inert gas, which is not itself capable of being cracked to gasoline, is most significant in the very early stages of the cracking reaction, which is also the period in which most of the cracking of fresh feed occurs. In fact, the curve of production of cracked hydrocarbon vapors from fresh feed with time is exponential with the greatest rate of cracking occurring at the outset of the reaction so that the cracked vapors themselves quickly reduce the partial pressure of the unreacted feed. However, by the time these vapors are produced most of the cracking has been completed. The extent of cracking of fresh hydrocarbon feed with a zeolite catalyst is considerably greater in the first 0.1 second interval in the reaction zone than in the second 0.1 second interval. Similarly, the extent of cracking of fresh hydrocarbon charge is considerably greater in the first 0.2 second interval in the reaction zone than in the second 0.2 second interval. For example, after the hydrocarbon feed has been in the reaction zone for about 0.1 second it is about 40 percent converted and after about 1.0 second conversion increases only to about 70 to 80 percent.

In control methods for fluid catalytic cracking operations according to the prior art, a vapor such as steam was added to the inlet of an elongated riser or reaction zone to assist dispersal of catalyst into hydrocarbon. The amount of steam was not considered particularly critical. Reactor residence time (space velocity) was then adjusted to control gasoline yield in the reactor effluent. If analysis of reactor effluent indicated an adjustment of the residence time was required, the hydrocarbon flow rate was adjusted. But no criticality was attached to the fact that this adjustment varied the ratio of steam to hydrocarbon at the reaction zone inlet. According to Ser. No. 836,383, filed June 25, 1969, entitled Fluid Catalytic Cracking Process, M. C. Bryson and J. R. Murphy, reaction zone residence time is established not only by establishing the total charge rate including both hydrocarbon and steam but also by establishing the ratio of steam to hydrocarbon in the charge in the manner described below. In this application it is shown that control of the ratio of steam to hydrocarbon in the charge and control of the total charge rate including both steam and hydrocarbon are interdependent and interdependently exert a critical effect on gasoline yield.

Although zeolitic aluminosilicates are especially useful catalysts for purposes of the present invention, any silica alumina or other cracking catalyst which is sufficiently active and/or selective to be capable of producing a transient maximum or peak gasoline yield from the total fresh hydrocarbon feed capable of being cracked to gasoline at residence times of 5 seconds or less are within the purview of this invention. The maximum gasoline yield obtained at residence times within five seconds is transient and rapidly diminishes. After a residence time of one second, most of the fresh hydrocarbon feed is converted and there is a sharp drop in rate of conversion of fresh feed. However, if the hydrocarbon continues to remain in contact with the catalyst, products of the earlier cracking operation themselves in turn undergo cracking. This occurrence is term "aftercracking." Since there is a greater abundance of cracked material than uncracked material after only about one-half to one second of reaction zone residence time or less the situation rapidly arises wherein considerably more cracking of cracked than uncracked material can occur. When this situation prevails, the desired gasoline product initially produced at a high selectivity in accordance with the present invention becomes depleted due to aftercracking at a faster rate than it is replenished due to cracking of remaining uncracked feed so that the selectivity advantage initially achieved is subsequently lost at a significant rate. If timely disengagement of hydrocarbon and catalyst does not occur prior to the occurrence of a significant amount of aftercracking the very existence of the earlier advantageous selectivity effect can be entirely masked. This invention requires substantially instantaneous disengagement of catalyst and hydrocarbon as these materials exit from the reaction zone into a disengaging vessel.

In accordance with the above mentioned patent application a preheated liquid hydrocarbon charge and a fluid zeolite or comparable cracking catalyst are added to a cracking reaction zone together with an inert gaseous diluent such as steam, nitrogen, recycle methane or ethylene, etc. The liquid hydrocarbon charge is substantially instantaneously vaporized and the quantity of inert diluent is sufficient to accomplish a substantial reduction in the partial pressure of the hydrocarbon charge. The selectivity to gasoline production is enhanced due to the lower hydrocarbon partial pressure at the onset of cracking of the fresh feed due to the presence of the diluent. In order not to subsequently lose the selectivity advantage the hydrocarbon is permitted to remain in the presence of the catalyst only as long as further conversion of uncracked hydrocarbon produces a significant increase in gasoline yield. The system is controlled so that substantially at the time when further conversion of uncracked hydrocarbon produces no significant net increase in gasoline yield or at the time when some decrease in gasoline yield ensues the catalyst and hydrocarbon are substantially instantaneously disengaged from each other to prevent aftercracking of gasoline product from destroying the selectivity advantage initially achieved due to the diluent partial pressure effect. Analysis of the product to measure total conversion of fresh feed or gasoline yield or both will aid in controlling the reactor in accordance with this invention. These analyses will provide a measure of gasoline selectivity for controlling the reactor. Reaction time duration can be adjusted by regulation of total feed rate, including hydrocarbon and steam, where the reactor height is fixed.

The overall time of contact between hydrocarbon and catalyst can be as low as about 0.5 second or less but not greater than about 5 seconds and will depend upon many variables in a particular process such as the boiling range of the charge, the particular catalyst, the amount of carbon on the regenerated catalyst, the catalyst activity, the reaction zone temperature, the polynuclear aromatic content of the hydrocarbon feed, etc. Some of these variables can affect one another. For example, if the fresh hydrocrabon charge includes a considerable quantity of polynuclear aromatics, the reaction should be permitted to proceed long enough to crack any mono- or di-aromatics or naphthenes because these compounds produce relatively high gasoline yields and are the most readily crackable aromatics but the reaction should be terminated before significant cracking of other polynuclear aromatics occurs because cracking of these latter compounds occurs at a slower rate and results in excessive deposition of carbon on the catalyst. It is clear, that no fixed cracking time duration can be set forth but the time will have to be chosen within the range of this invention depending upon the particular system, In one system, slightly exceeding a 1.0 second residence time might result in such severe aftercracking that the selectivity advantage would be lost while in another system unless a 1.0 second residence time is appreciably exceeded there might not be sufficient cracking of charge hydrocarbon to render the process economic. Generally, the residence time will not exceed 2.5 or 3 seconds and 4 second residence times will be rare.

FIG. 1 contains curves semiquantitatively relating the amount of unreacted charge and gasoline, as percent based on fresh feed, to reaction zone residence time. The curve of unreacted charge which is typical of most fluid cracking charge stocks shows that the amount of unreacted charge asymptotically approaches a value somewhat less than 20 percent of fresh feed within residence times of this invention. The curves showing quantity of gasoline produced show that the quantity of gasoline produced rapidly reaches a somewhat flat maximum or peak which generally coincides with the time at which the cracking of unreacted charge is substantially diminished. The gasoline yield at the peak for a given feed will be determined mostly by reactor temperature, to an extent by the level of carbon on the catalyst and to an extent by the catalyst to oil ratio. After reaching a peak, the gasoline level diminishes because the aftercracking of gasoline predominates over production of gasoline from the unreacted feed. The lower of the two gasoline curves shown in FIG. 1 indicates the level of gasoline in the reaction zone assuming substantially no inert diluent such as steam is introduced to the inlet zone of the reactor. The upper of the two gasoline curves schematically shows the higher gasoline level achieved by adding an inert diluent such as steam to the inlet of the reaction zone which lowers the hydrocrabon feed partial pressure and thereby increases selectivity to gasoline.

Assuming a fluid cracking process is operating with steam addition and the gasoline yield is at point A shown in FIG. 1 where significant aftercracking has occurred. In order to reduce the extent of aftercracking it is decided to increase the charge rate of hydrocarbon into the reaction zone, thereby reducing hydrocarbon residence time. In a non-dense bed reactor residence time is usually adjusted by adjustment of hydrocarbon charge rate rather than steam charge rate since for any given percentage increase or decrease in charge rate of steam or hydrocarbon, the effect upon reaction residence time will be much greater in the case of the hydrocarbon adjustment because the total amount of hydrocarbon charged is so much greater than the total amount of steam charged. Due to the shorter residence time and concomitant reduction in aftercracking a higher gasoline yield B is achieved. However, because the hydrocarbon partial pressure at the reaction zone inlet has been increased by an increase in hydrocarbon flow rate, the point B is removed from the upper gasoline curve in the direction of the lower gasoline curve and is outside the cross-hatched zone which denotes the range of this invention. The cross-hatched zone shown in FIG. 1 denotes the transient elevated gasoline yields of this invention which can be recovered by the use of an inert vapor but which could not be recovered absent an inert vapor. On the other hand, if the same decrease in hydrocarbon residence time were achieved by increasing both hydrocarbon and steam flow rate in the same ratio so that the partial pressure of hydrocarbon at the reaction zone inlet remained unchanged at the new residence time, the new operating point would be at B', instead of B, which is within the range of the present invention. (Of course, if the same total flow rate were achieved by increasing the ratio of steam to hydrocarbon the new operating point would be above B' and the area covered by the cross-hatched zone of this invention would be enlarged.) Now, if the hydrocarbon charge rate is again increased to further reduce residence time, the point C is reached which is further removed from the upper gasoline curve in the direction of the lower gasoline curve than is point B because the hydrocarbon partial pressure is further increased in going from point B to point C. Again, because of the increase in hydrocarbon partial pressure, point C is outside the range of the invention. On the other hand, if the same residence time indicated at point C is achieved by increasing the flow rate of both steam and hydrocarbon, rather than hydrocarbon alone, so that the hydrocarbon partial pressure at the new residence time is the same as it was at point A, the point C' is achieved which is within the range of this invention.

It is seen from FIG. 1, that operating points B and C represent essentially similar gasoline conversion levels occurring at different residence times apparently indicating that these points lie close to a flat maximum gasoline yield. However, points B and C lie outside the range of the present invention while operating points B' and C', which are within the range of this invention, lie at higher gasoline yield levels than points B and C, even though points B and B' and points C and C' represent the same residence times, respectively. Starting from point A, point B' is reached by the method of lowering residence time via a change in both steam flow rate and hydrocarbon flow rate while, also starting from point A, point B is reached by the method of changing hydrocarbon flow rate only to achieve the same residence time as point B'. Starting from point B', point C' is reached by changing both steam flow rate and hydrocarbon flow range to lower the residence time, while point C is reached by the simpler method of changing hydrocarbon flow rate only to achieve the same residence time as at point C'. It is apparent that to achieve the gasoline selectivity advantage of the above-mentioned patent application, the residence time and the apportioning of steam and hydrocarbon flow rates to achieve said residence time are interdependent and represent a critical combination for purposes of process control.

In accordance with the present invention, residence time is adjusted without adjusting the flow rate of either hydrocarbon oil feed or diluent vapors. Therefore, the adjustment of residence time in no way affects the ratio of hydrocarbon feed to diluent vapor so that the recovery of a greater yield or gasoline from the process in the presence of the diluent vapor than could be recovered in the absence of the diluent vapor is facilitated. Although increasing or decreasing the quantity of diluent vapors and/or hydrocarbon feed or increasing or decreasing the ratio between the two, is not requisite to residence time adjustment in accordance with this invention, these adjustments can be made in practising this invention for purposes other than residence time adjustment, i.e. to adjust gasoline selectivity.

In accordance with this invention the combined advantage of a reduced partial pressure and a low residence time for a hydrocarbon feed to be cracked to gasoline and other materials is obtained in a dense bed reaction system. A dense catalyst bed is maintained having a depth which is controlled by adjusting a valve controlling flow of used or deactivated catalyst from the cracking zone. Catalyst together with a relatively small amount of vapor or a vapor-producing material such as a hydrocarbon stream which can be cracked to produce diluent gases, such as a recycle stream, is charged at or relatively near the bottom of the dense bed so that this hydrocarbon experiences a relatively long residence time in the dense bed. An inert diluent vapor, such as steam, nitrogen, methane or hydrogen can be employed instead of the recycle stream. The major portion of the total hydrocarbon feed, i.e. more than 50 percent by volume and up to 90, 95 or even 99 percent by volume, is charged relatively near the top of the dense bed so that its residence time in the bed is relatively low. The vapor or vapor-producing stream is introduced into the bed at or below the height at which the hydrocarbon feed is introduced. In this manner, cracking of the relatively small volume charge stream near the bottom of the dense bed provides a proliferation of gases to lower the partial pressure of the major feed stream which is charged at a higher level in the bed. Any adjustment in bed height provides a relatively great effect upon residence time of the major feed stream while the same adjustment provides a relatively small effect upon residence time of the minor charge stream and in no way affects the extent of cracking of the minor charge stream up to the point of entry of the major charge stream. Thereby, an adjustment in bed height by itself in no way effects the ratio of the major hydrocarbon feed to diluent vapors.

The quantity of the minor charge stream will be sufficiently small not to seriously affect the cracking of the major stream in an adverse manner by excessive deposition of carbon on the catalyst which is subsequently employed to crack the major stream. For example, the quantity of the minor hydrocarbon charge stream is preferably sufficiently low that there is not sufficient carbon deposition on the catalyst to heat the catalyst to a sufficient temperature upon regeneration that the catalyst would be suitable for reuse in a cracking operation but that the further use of the catalyst for cracking of the major stream is required to increase the carbon level on the catalyst sufficiently so that upon regeneration the catalyst will be hot enough for reuse.

The quantity of hydrocarbon feed in the minor or diluent stream should also be sufficiently small that it does not reduce the temperature of the regenerated catalyst to a level sufficiently low that the desired temperature for cracking the major hydrocarbon feed stream cannot be maintained. After the minor hydrocarbon feed stream has extracted heat from the regenerated catalyst through both vaporization and cracking the temperature of the catalyst stream at the major hydrocarbon feed inlet should be high enough to maintain the desired temperature in the zone of cracking of the major feed stream.

A particular advantage of controlling residence time via control of bed height is that once the ratio of hydrocarbon feed to diluent vapor is established residence time control can be achieved without further adjustment of hydrocarbon feed rate, diluent rate, or the ratio of the two, although an additional residence time adjustment or a gasoline selectivity adjustment can be accomplished by increasing or decreasing any of these three variables. In high length to diameter ratio risers having a non-dense catalyst phase system, residence time is adjusted via adjustment of hydrocarbon throughput rate, i.e. at the expense of tampering with production level from the cracker and at the expense of tampering with hydrocarbon feed to diluent ratio, which can affect gasoline selectivity. According to the present invention the residence time can be adjusted at a constant hydrocarbon feed rate and diluent rate and at a constant ratio between the two by adjusting only the height of the dense phase catalyst bed through which the hydrocarbon feed travels. Therefore, this process controls residence time through control of catalyst relative inlet and effluent rate or by control of effluent rate alone rather than through control of hydrocarbon flow rate. For example, an adjustment in residence time can be made by adjustment of catalyst effluent rate without adjustment of hydrocarbon flow rate. Any adjustment of hydrocarbon feed or diluent rate will have only a very minor effect upon residence time because of the relatively small length to diameter ratio and high volume of a reactor utilized in a dense catalyst bed system.

The minor hydrocarbon feed or diluent stream can be injected at a plurality of heights in the bed below or at the height of injection of the major feed stream, but not above the height of injection of the major feed stream. However, the total effect of the plurality of streams injected should be as described above for a single stream. Similarly, the major hydrocarbon feed stream described can comprise a plurality of streams injected at differing heights. If the major hydrocarbon feed stream is segregated into fractions of various boiling points, the lowest molecular weight fraction, which is the most refractory fraction, should be added at the greatest depth in the catalyst bed to provide it with the greatest residence time in the bed. Fractions of progressively higher molecular weight which are progressively less refractory are charged at progressively more shallow depths so that the highest molecular weight fraction is charged closest to the top of the bed. Since the highest molecular weight fractions tend to deposit relatively great quantities of carbon on the catalyst at prolonged residence times these fractions interfere least with cracking of the lower molecular weight fractions by being added latest to the reactor.

The density of the catalyst bed of this invention is not critical as long as it is above 5 or 6 pounds per cubic foot and can be between about 7 or 10 and 50, generally, or between 15 and 40 pounds per cubic foot, preferably. Suitable space velocities based upon the major hydrocarbon feed are about 1 to about 30 or even up to 50 weight per hour per weight, or 5 to 15, preferably.

In any particular process the gasoline yield and residence time values which encompass the gasoline selectivity advantage described above will depend upon many variables peculiar to the particular process. These variables include the particular catalyst which is employed, the level of carbon on the regenerated catalyst, the bed depth, bed density, catalyst activity and/or selectivity, the temperature, the refractory characteristics of the feed, etc. The extent of the selectivity advantage might be as low as one-half percent to one percent or as high as three to five percent depending upon the ratio of diluent vapor to hydrocarbon feed at the reactor inlet. Where gasoline is the most economically desirable product of the cracking operation, the economic value of a selectivity advantage of even one-half or one percent actually recovered as effluent is considerable in a commercial reactor unit which processes 100,000 or 150,000 barrels per day of hydrocarbon feed.

The reaction temperature in accordance with this invention is at least about 900° F. The upper limit can be about 1100° F., or more. The preferred temperature range is 950 to 1050° F. The reaction total pressure can vary widely and can be, for example, 5 to 50 p.s.i.g., or preferably, 20 to 30 p.s.i.g. The maximum residence time is 5 seconds, and for most charge stocks the residence time will be about 1.5 or 2.5 seconds or, less commonly, 3 or 4 seconds. For high molecular weight charge stocks which are rich in aromatics a 0.5 to 1.5 second residence time could be suitable in order to crack mono- and diaromatics and naphthenes which are the aromatics which crack most easily and which produce the highest gasoline yield, but to terminate the operation before appreciable cracking of polyaromatics occurs because these materials produce high yields of coke and $C_2$ and lighter gases. The amount of diluent can vary depending upon the ratio of hydrocarbon to diluent desired for control purposes. If steam is the diluent employed, a typical amount to be charged can be about 10 percent by volume, which is about 1 percent by weight, based on hydrocarbon charge. A suitable but nonlimiting proportion of diluent gas, such as products of cracking, steam or nitrogen, to fresh hydrocarbon feed can be 0.5 to 10 percent by weight.

A zeolite catalyst is a highly suitable catalytic material in accordance with this invention. A mixture of natural and synthetic zeolites can be employed. Also, a mixture of crystalline zeolitic organosilicates with non-zeolitic amorphous silica-aluminas is suitable as a catalytic entity. Any catalyst containing zeolitic material or otherwise which provides a transient maximum gasoline yield within a 5 second residence time is suitable. The catalyst particle size must render it capable of fluidization as a dense phase in the reactor. A suitable weight ratio of catalyst to total oil charge is about 4:1 to about 12:1 or 15:1 or even 25:1, generally, or 6:1 to 10:1, preferably. The fresh hydrocarbon feed is generally preheated to a temperature of about 600 ot 700° F. but is generally not vaporized during preheat, and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst the less catalyst is required to achieve a given reaction temperature. Generally, catalyst regeneration can occur at an elevated temperature of about 1240° F. or 1250° F. or more to reduce the level of carbon on the regenerated catalyst from about 0.6 to 1.5 to about 0.05 to 0.3 percent by weight. At usual catalyst to oil ratios in the feed, the quantity of catalyst is more than ample to achieve the desired catalytic effect and therefore if the temperature of the catalyst is high, the ratio can be safely decreased without impairing conversion. Since zeolitic catalysts are particularly sensitive to the carbon level on the catalyst, regeneration advantageously occurs at elevated temperatures in order to lower the carbon level on the catalyst to the stated range or lower.

A wide variety of hydrocarbon oil charge stocks can be employed. A suitable charge is a gas oil boiling in the range of 430 to 1100° F. As much as 5 to 20 percent of the fresh charge can boil above this range. Some residual oil can be charged. A 0 to 5 percent recycle rate can be employed. Generally, the recycle will comprise 650° F.+ oil from the product distillation zone which contains catalyst slurry. If there is no catalyst entrainment, recycle can be omitted.

EXAMPLE 1

A series of tests were conducted which illustrate the effect of reducing hydrocarbon partial pressure upon selectivity to debutanized gasoline and to $C_3+$ liquid yield. The tests were conducted in an elongated reactor and the hydrocarbon partial pressure was reduced by addition of steam and nitrogen with the feed hydrocarbon. The ranges of conditions of the various tests were as follows:

Charge stock inspections

| | |
|---|---|
| Gravity: ° API | 25.6 |
| Sulfur: weight percent | 0.8 |
| Ramsb. carbon residue: weight percent | 0.42 |
| Vac. distillation (corres. to 760 mm. Hg) ° F. at— | |
| 10% | 580 |
| 30% | 692 |
| 50% | 767 |
| 70% | 847 |
| 90% | 969 |
| $C_A$ (percent of aromatic molecules) | .18 |

Catalyst

Zeolite (50–60 Kellogg 2-hour activity)

Cracking conditions

| | |
|---|---|
| Temperature: ° F. | 950 |
| Contact time: seconds | 0.1–2.0 |
| Cat-to-oil ratio | 6.5–9.0 |
| Recycle | None |
| Riser total pressure: p.s.i.g. | 23–30 |
| Riser gas composition (inlet): mol percent: | |
| Hydrocarbon | 5–80 |
| Steam | 5–90 |
| Nitrogen | 2–31 |

Figure 2:
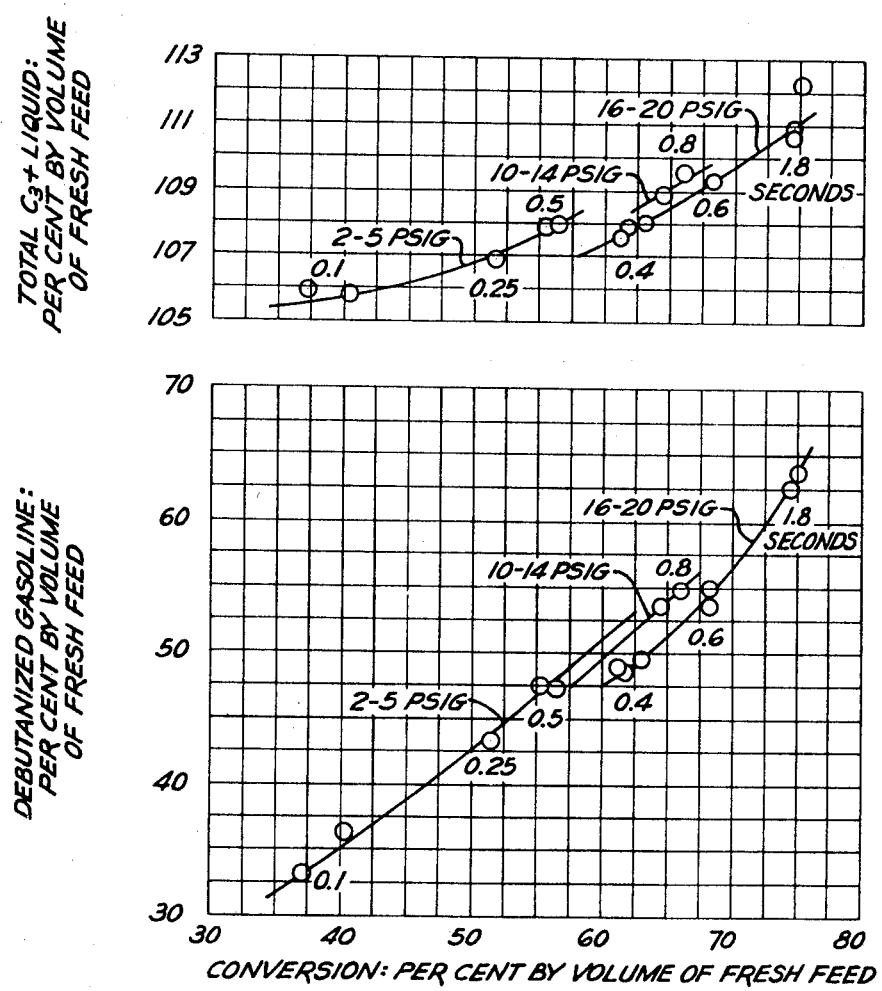

The results of the tests are illustrated in FIG. 2 in which debutanized gasoline yield and total $C_3+$ liquid yield, both reported as percent by volume of fresh feed, are plotted against total conversion at various partial pressures of hydrocarbon in the system and at various residence times. The pressure ranges given on the face of the graphs indicate the partial pressure in the system of all hydrocarbon vapors, cracked and uncracked, with the remainder of the reactor pressure accounted for by nitrogen and steam, both nitrogen and steam being used in all tests. For each partial pressure, conversion data is indicated for one or more residence times.

As shown in FIG. 2, at any given conversion level the selectivity to gasoline as well as to total $C_3+$ liquid increases with decreasing hydrocarbon partial pressure. Taking a 60 percent conversion level for purposes of example, when the hydrocarbon partial pressure is 16–20 p.s.i.g., the gasoline yield is 47.5 percent; when the hydrocarbon partial pressure is 10–14 p.s.i.g. the gasoline yield increases to almost 50 percent; and when the hydrocarbon partial pressure is 2–5 p.s.i.g. the gasoline yield increases still further to about 51.5 percent. Advantageously, a greater improvement in gasoline selectivity occurred in reducing hydrocarbon partial pressure from 16–20 p.s.i.g. to 10–14 p.s.i.g. than occurred in reducing hydrocarbon partial pressure from 10–14 p.s.i.g. to the very low partial pressure level of 2–5 p.s.i.g. This shows that the gasoline selectivity advantage was realized to a very significant extent in the initial partial pressure reduction step of the tests and the effect was not as great but still substantial in the second partial pressure reduction step of the tests.

EXAMPLE 2

Tests were conducted to illustrate the advantage of a crystalline zeolite aluminosilicate catalyst over an amorphous silica-alumina catalyst in a fluid catalytic cracking system. Both catalysts were tested under sufficiently low space velocity conditions that a dense phase bed formed in the reactor. The results are shown in Table 1.

TABLE 1

| Charge stock: | | |
|---|---|---|
| Characterization factor | 12.09 | 11.95 |
| Gravity, ° API | 29.7 | 29.4 |
| Sulfur, percent | 0.42 | 0.36 |
| Viscosity, SUS at, ° F.: | | |
| 130 | 60.3 | |
| 150 | 51.1 | |
| 210 | 38.6 | 37.3 |
| Carbon residue, Ramsbottom: Percent ASTM D524 | 0.23 | 0.21 |
| Aniline point, ° F. | 188 | 184 |
| Bromine Number, D1159 | 2.8 | 3.0 |
| Pour point, D97, ° F. | 90 | |
| Nitrogen, p.p.m. | 710 | 450 |
| Metals, p.p.m.: | | |
| Vanadium | 0.2 | 0.4 |
| Nickel | 0.2 | 0.1 |
| Distillation vac. (Corres. to 760 mm. Hg): | | |
| 10% over at, ° F | 568 | 556 |
| 30% over at, ° F | 659 | 622 |
| 50% over at, ° F | 744 | 699 |
| 70% over at, ° F | 845 | 809 |
| 90% over at, ° F | 979 | 939 |
| 95% over at, ° F | | 991 |

| Catalyst | 100 percent amorphous silica-alumina | 60 percent zeolite, 40 percent silica-alumina |
|---|---|---|
| Kellogg activity (2 hours) | 33.8 | 50.6 |
| Operating conditions; reactor: | | |
| Fresh feed rate, B/D | 13,571 | 13,704 |
| Reactor bed temperature, ° F | 926 | 935 |
| Feed preheat temperature, ° F | 700 | 649 |
| Reactor bed pressure, p.s.i.g. | 11.5 | 11.0 |
| Space velocity (total feed), weight/hour/weight | 3.94 | 3.07 |
| Catalyst to oil ratio (total feed), weight/weight | 12.5 | 9.8 |
| Recycle, percent by volume of fresh feed | 74.3 | 31.4 |
| Carbon on regenerated catalyst, percent by weight | 0.4 | 0.38 |
| Conversion, percent by volume of fresh feed | 75.5 | 85.5 |
| Operation conditions, regenerator: | | |
| Regenerated bed temperature, ° F | 1,141 | 1,166 |
| Total regenerated air, M pounds/hr | 153.7 | 166.72 |
| Pounds coke burned/pounds air, weight/weight | 0.087 | 0.083 |
| Yields, percent by volume of fresh feed: | | |
| Debutanized gasoline | 47.5 | 61.0 |
| Butane-butene | 21.2 | 21.6 |
| i-Butane | 7.6 | 10.3 |
| n-Butane | 2.1 | 1.7 |
| Butenes | 11.6 | 9.6 |
| Propylene: | | |
| Propane | 4.2 | 5.7 |
| Propylene | 8.5 | 5.9 |
| Total liquid recovery | 105.9 | 108.7 |
| $C_2$ and lighter gas, percent by weight | 4.4 | 2.9 |
| Coke, percent by weight | 7.73 | 7.8 |
| Inspections: | | |
| Motor, clear | | 81.3 |
| Motor, plus 3 cc. TEL | 86.1 | 89.4 |
| Research, clear | 94.0 | 93.4 |
| Research, plus 3 cc. TEL | 100.4 | 98.3 |

As shown in Table 1, the zeolite catalyst system exhibited a conversion of 85.5 percent compared to only 75.5 percent for the amorphous catalyst. In addition, the zeolite catalyst system exhibited at 61.0 percent yield of gasoline compared to only 47.5 percent gasoline yield with the amorphous catalyst. However, while the total yield of $C_3$ and $C_4$ hydrocarbons is about the same for the zeolite and the amorphous catalyst, the proportion of these $C_3$ and $C_4$ hydrocarbons which are olefinic is lower when utilizing a zeolite catalyst in these tests. This is a disadvantage arising when utilizing a zeolite catalyst with extetnded residence times in a dense catalyst bed because $C_3$ and $C_4$ olefins are useful for the production of alkylate which can be blended with the gasoline produced directly by cracking to improve its octane value.

EXAMPLE 3

Further tests were conducted to illustrate the use of the same type of zeolite catalyst employed in Example 2 for fluid catalytic cracking not only at relatively high residence times involving space velocities low enough to permit a dense phase catalyst bed to form in the reactor to provide extended residence times but also at very low residence times at which the velocity through the reactor is sufficiently high that no bed formation within the reactor is permitted to occur and residence time is low. The results are shown in Table 2.

TABLE 2

| Test | 1 | 2 | 3 | 4 |
|---|---|---|---|---|
| Catalyst | Zeolite | Zeolite | Zeolite | Zeolite |
| Catalyst bed formation | Yes | No | Yes | No. |
| Cracking temperature, °F | 950 | 950 | 1,000 | 1,000 |
| Space velocity (total feed) | 19.2 | >100 | 19.3 | >100 |
| Contact time, seconds | (¹) | 0.5 | (¹) | 2.0 |
| Recycle, percent by volume | 2.4 | 5.3 | None | None |
| Conversion, percent by volume | 72.8 | 77.1 | 76.2 | 80.9 |
| Yields, percent by volume of fresh feed: | | | | |
| Total $C_3$ | 9.9 | 10.4 | 11.7 | 11.3 |
| $C_3=$ | 6.6 | 6.7 | 7.5 | 9.0 |
| Total $C_4$ | 14.2 | 16.0 | 15.8 | 17.7 |
| $C_4=$ | 6.8 | 7.6 | 8.0 | 7.8 |
| Debutanized gasoline | 55.8 | 60.2 | 56.2 | 63.8 |
| $C_5=$ | 4.8 | 4.8 | 5.0 | 4.3 |
| $C_6$ plus gasoline | 44.2 | 47.9 | 44.8 | 50.8 |
| Total $C_3$ plus liquid | 106.8 | 109.5 | 107.5 | 111.9 |
| $C_2$ and lighter, percent by weight | 3.6 | 2.5 | 4.1 | 2.1 |
| Coke, percent by weight | 5.6 | 6.0 | 5.0 | 4.5 |
| Gasoline octane: | | | | |
| Motor, clear | 79.3 | 79.6 | 80.6 | 79.3 |
| Motor, plus 3 cc | 85.4 | 86.2 | 86.4 | 86.3 |
| Research, clear | 92.3 | 92.6 | 93.5 | 91.4 |
| Research, plus 3 cc | 100.2 | 99.6 | 99.5 | 98.7 |

¹ Dense bed-extended time.

A comparison of Tests 1 and 2 of Table 2, both conducted at 950° F., shows the deleterious effect of extended residence time when employing a zeolite catalyst. The residence time of Test 2 was only 0.5 second and yet it exhibited a higher gasoline yield and a lower $C_2$ and lighter yield than Test 1 in which the residence time was considerably longer due to a lower space velocity in the dense catalyst bed. A comparison of Tests 1 and 2 shows that an extended residence time diminishes gasoline yield and increases the yield of products boiling lower than gasoline.

Comparing Test 3 with Test 1, both involving dense bed and extended residence time cracking, it is seen that raising the cracking temperature from 950° to 1000° F., provided a significant increase in conversion but very little increase in debutanized gasoline yield and a higher yield of $C_2$ and lighter, showing that the high degree of aftercracking due to extended residence time prevents effective control of gasoline yield via temperature adjustment.

Comparing Test 4 with Test 2, both involving non-bed cracking and very low residence times within the range of this invention, it is seen that raising the cracking temperature from 950° to 1000° F. provided not only a significant increase in conversion but also an equally significant increase in gasoline yield coupled with a lower yield of both $C_2$ and lighter and coke, showing that the comparative absence of aftercracking at the very low residence times of this invention permits control of gasoline yield via temperature regulation. It is also noted that Test 4 provided good yields of $C_3$ olefin and $C_4$ olefin which are valuable materials for preparation of alkylate gasoline.

Since Table 2 indicates that in low residence time non-dense bed systems gasoline yield can be effectively controlled via temperature regulation, it follows that a reduction in temperature might be useful on occasion in an operating plant to reduce gasoline yield as required by subsequent fractionator load or to decrease $C_3$ olefin and $C_4$ olefin production. However, no matter what the operating temperature is the gasoline yield at that temperature is increased by utilizing the control method of this invention.

Figure 3:
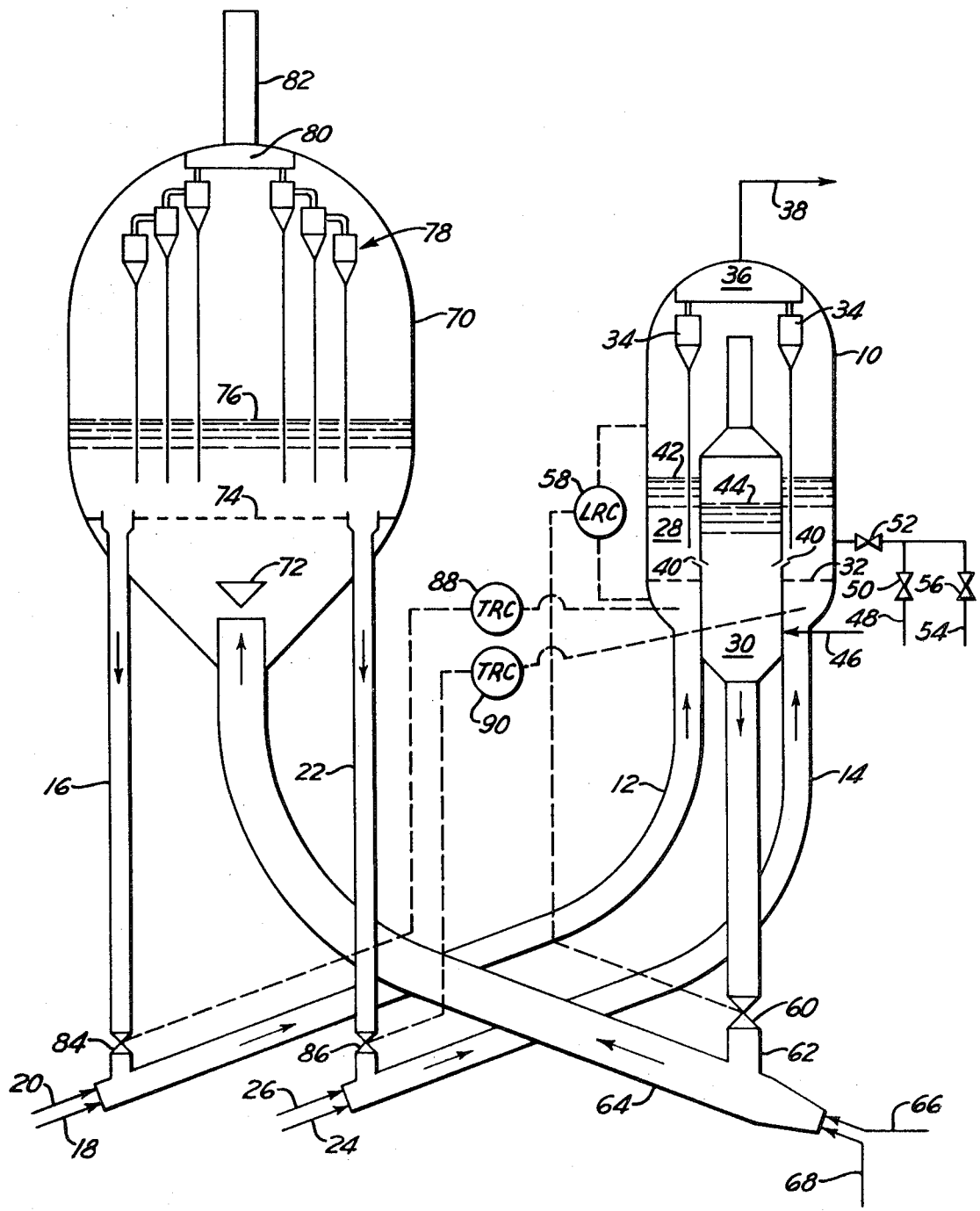

An example of the process of this invention is illustrated by reference to FIG. 3. As shown in FIG. 3, reactor 10 is supplied with regenerated catalyst through risers 12 and 14. Riser 12 accepts hot regenerated catalyst through stand-pipe 16 and catalyst slurry recycle oil through line 18. Steam is added to riser 12 through line 20. Riser 14 accepts hot regenerated catalyst through stand-pipe 22 and is supplied with catalyst slurry recycle oil through line 24 and with steam through line 26. The reactor portion of chamber 10 comprises an annular zone 28 surrounding a central circular stripping zone 30. Material entering reaction zone 28 from risers 12 and 14 passes through a grid 32. A dense bed of catalyst overlies grid 32. The density of the catalyst in this bed is about 20 to 30 pounds per cubic foot. Cracked and uncracked vapor passes through cyclone separators 34 before leaving reactor 10 through chamber 36 and line 38.

Catalyst is discharged from annular reaction zone 28 to stripping zone 30 through one or more openings 40 providing access between the two zones. Dense phase catalyst level 42 in the reaction zone is higher than dense phase catalyst level 44 in the stripping zone so that the differential head urges catalyst from reaction zone 28 to stripping zone 30 through one or more openings 40 disposed at an intermediate height in the fixed catalyst bed and below the top thereof. The density of catalyst in stripping zone 30 is about 35 pounds per cubic foot. The temperature of the gases above catalyst level 42 and above catalyst level 44 is about 950 to 1025° F. Stripping steam is added to stripping zone 30 through line 46.

Gas oil feed is charged to reaction zone 28 through line 48, valve 50 and nozzle 52. Atomizing steam is mixed with the gas oil feed after passage through line 54 and valve 56. The boiling range of the gas oil feed is between about 430 and 1100° F. the gas oil is charged to reaction zone 28 at an elevation in the bed sufficiently close to catalyst level 42 that the residence time of the gas oil in the dense bed will be between about 0.5 and 5 seconds and preferably between about 0.5 and 2 or 2.5 seconds.

Gas oil feed nozzle 52 is sufficiently close to catalyst level 42 that the residence time of the gas oil in reaction zone 28 will be very sensitive with respect to changes in catalyst level 42. Catalyst level 42 is controlled by level recorder controller 58 which controls valve 60 in standpipe 62 which extends from stripping zone 30 to regenerator riser 64. It is seen that level recorder controller 58 by adjusting valve 60 regulates the rate of removal of deactivated catalyst from stripping zone 30 and in turn adjusts the height of catalyst 42 in reaction zone 28. The height of catalyst 42 determines the residence time of the gas oil stream entering through nozzle 52.

Steam is added to spent catalyst riser 64 through line 66 while combustion air is added to spent catalyst riser 64 through line 68. Spent catalyst enters regenerator 70 in flowing past a dispersal baffle 72 and a grid 74 so that a dense bed catalyst level 76 is established in the regenerator. The density of the regenerator catalyst bed is about 35 pounds per cubic foot and the temperature of the bed is about 1100° F. The density of the entering stream between riser 64 and grid 74 is about 30 pounds per cubic foot. Gases rising from regenerator bed level 76 increase in temperature to about 1200–1250° F. before entering cyclone system 78 from which the effluent gases are exhausted from the system through chamber 80 and conduit 82.

Regenerated catalyst leaves regeneration chamber 70 through regenerated catalyst standpipes 16 and 22 provided with valves 84 and 86, respectively. The temperature in reaction zone 28 is controlled by temperature recorder controller 88 which controls valve 84 and by temperature recorder controller 90 which controls valve 86. The temperature in regenerated catalyst risers 12 and 14 is determined by the degree of openings of valves 84 and 86, respectively.

Under conditions as described above when charging a gas oil as described below through nozzle 52 so that its residence time is controlled at about 1.5 to 1.8 seconds rather than being charged at the bottom of risers 12 and 14 with extended residence times of 10 to 30 seconds, the debutanized gasoline yield can be expected to be increased from about 58.5 to about 64.5 volume percent, the total recovery can be expected to be increased from about 110.6 to about 114.6 volume percent and the amount of coke on the used catalyst can be expected to be decreased from about 7.9 to about 6.0 weight percent. Detailed results to be expected are shown in the following table. A typical description of the feed gas oil is presented under Example 1, above.

|  | Gas oil charged— | |
|---|---|---|
|  | To bottom of risers | Near top of catalyst bed with control of bed height |
| Feed rate, B/D | 51,000 | [1] 51,000 |
| Propane-propylene, column percent based on fresh feed | 12.5 | 8.9 |
| $C_3=$ | 8.0 | 6.0 |
| $C_3$ | 4.5 | 2.9 |
| Butane-butylene, volume percent based on fresh feed | 16.1 | 15.1 |
|  | 16.1 | 15.1 |
| $iC_4$ | 7.5 | 6.4 |
| $nC_4$ | 2.6 | 1.6 |
| $C_4=$ | 6.0 | 7.1 |
| Debutanized gasoline, volume percent | 58.5 | 64.5 |
| $C_5=$ | 2.8 | 4.7 |
| $iC_5$ | 5.8 | 7.5 |
| $nC_5$ | 2.7 | 1.0 |
| Light gas oil, volume percent | 15.0 | 18.8 |
| Decanted oil, volume percent | 5.0 | 4.0 |
| $C_3$ plus liquid, volume percent | 107.1 | 111.3 |
| Total recovery, volume percent | 110.6 | 114.6 |
| Conversion, volume percent | 80.0 | 77.2 |
| Coke, weight percent | 7.9 | 6.0 |
| Contact time, seconds | ca. 10–30 | 1.5 |

[1] Assuming a fresh feed gravity at 25.0°API.

I claim:

1. A cracking process comprising passing fluidized zeolite cracking catalyst upwardly through a first dense catalyst bed having a first bed level and disposed in an annular cracking zone, discharging catalyst from said first bed laterally into a second dense catalyst bed having a second bed level disposed in a concentric interior stripping zone under the influence of the differential head of the beds, charging hydrocarbon feed to said first bed at an elevation sufficiently close to said first bed level so that the residence time of the hydrocarbon flowing upwardly in the first bed is less than five seconds, and regulating the height of catalyst in said first bed by controlling catalyst effluent rate from said second bed.

2. The process of claim 1 including the introduction of a vapor or a vapor-producing material to said first bed at an elevation therein below the elevation of introduction of hydrocarbon feed.

3. The process of claim 1 wherein the temperature in the first bed is 900 to 1100° F.

4. The process of claim 1 wherein the pressure is 5 to 50 pounds per square inch gauge.

5. The process of claim 1 wherein the hydrocarbon feed is a gas oil.

6. The process of claim 1 wherein diluent vapor is passed into said first bed with the catalyst.

7. The process of claim 1 wherein steam is admixed with the hydrocarbon feed.

References Cited

UNITED STATES PATENTS 3,433,733  3/1969  Bunn, Jr., et al. _____ 208—150
3,406,112  10/1968  Bowles _____ 208—153

DELBERT E. GANTZ, Primary Examiner

G. E. SCHMITKONS, Assistant Examiner

U.S. Cl. X.R.

23—288 S; 208—158, 160, 164